No. 874,084. PATENTED DEC. 17, 1907.
F. JOTTRAND & F. SCHMIDT.
J. E. JOTTRAND, WIDOW OF F. JOTTRAND, DECEASED, AND A. JOTTRAND, ASSOCIATE GUARDIAN
OF THE HEIRS-AT-LAW.
PROCESS FOR WELDING METALS.
APPLICATION FILED JULY 23, 1903.

Witnesses:
Inventors

UNITED STATES PATENT OFFICE.

FELIX JOTTRAND, OF UCCLE, NEAR BRUSSELS, AND FREDERICK SCHMIDT, OF NAMUR, BELGIUM; JULIA RENARD JOTTRAND, WIDOW OF FELIX JOTTRAND, DECEASED, AND AUGUSTE JOTTRAND, ASSOCIATE GUARDIAN OF THE HEIRS-AT-LAW, ASSIGNORS OF ALL OF THEIR RIGHTS TO SOCIÉTÉ ANONYME L'OXHYDRIQUE INTERNATIONALE, A CORPORATION OF BELGIUM.

PROCESS FOR WELDING METALS.

No. 874,084.     Specification of Letters Patent.     Patented Dec. 17, 1907.

Application filed July 23, 1903. Serial No. 166,663.

*To all whom it may concern:*

Be it known that FELIX JOTTRAND, a subject of the King of Belgium, residing at Uccle, near Brussels, and FREDERICK SCHMIDT, a subject of the Emperor of Germany, residing at 10 Boulevard du Nord, Namur, in the Kingdom of Belgium, engineers, have invented certain new and useful Improvements in Processes for Welding Metals, of which the following is a specification.

This invention has reference to the art of welding metals, and particularly relates to that branch of the art wherein is employed a flame of an oxyhydrogen blow-pipe, or of an electric arc, or of any other source of heat, for welding the metals together without the use of any material other than that afforded by the pieces to be joined. In this particular branch of the art, the invention has special reference to the welding of metallic pieces of different thicknesses and may be employed, for instance, in the manufacture of pipes provided with flanges, or in the manufacture of metallic casks or the like.

Hitherto when it was desired to weld together two metallic pieces of different thicknesses, the following inconvenience was experienced: When the blow-pipe, or other heating apparatus, was used to bring the pieces to welding temperature, the thinner piece was raised to said temperature sooner than the thicker one, with the result that the thinner piece was fused and burnt before the thicker piece actually became red-hot. Therefore, it was found to be practically impossible, without great loss of valuable materials, or the loss of valuable time and labor, to weld together two pieces of very different thickness.

Therefore, this invention has for its objects to avoid the above inconvenience, prevent the loss of materials, and to allow the welding of two pieces of different thickness with the same facility as when it is desired to unite or fuse together two pieces of the same, or nearly the same, thickness.

Figure 1:
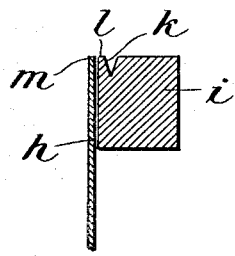
Figure 2:
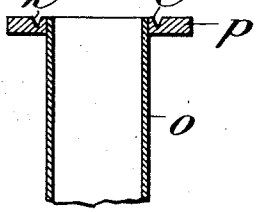

In order that my process may be readily understood, the same will be illustrated in connection with the accompanying drawings, in which:

Figure 1 shows in section two pieces of material and illustrates the application of the improved process, showing the manner of uniting together a sheet of metal and a metallic block or, generally speaking, the manner of joining a thin metallic piece to a thick piece of metal; Fig. 2 is a similar view and shows the application of the process to the manufacture of pipes provided with flanges; and Fig. 3 shows the application of the process to the manufacture of metallic casks.

Referring to Fig. 1, if it is desired to weld a thin piece, such as a sheet $h$ for example, to a thick piece $i$, the said piece $i$ would ordinarily require heating a much longer time, before it would be raised to the point of fusion, than the thin piece $h$, and when operating according to the ordinary processes, the thin piece would be burned or fused before the thick piece $i$ became sufficiently hot. According to this invention, a notch or groove $k$ is formed or cut in the thick piece $i$, near one edge and at the side which is to be welded, so as to form a lip $l$ having substantially the same thickness as the thin piece $h$. The extremity $m$ of the thin piece or sheet $h$ is then placed against the said side of piece $i$ and substantially flush with lip $l$, and the said two parts are then fused together.

When the process is to be applied to the manufacture of pipes provided with flanges $p$ (Fig. 2) it may be carried out in a quite similar manner, the flange $p$ being first provided with a notch $k'$ so as to form, at the center of the flange, an annular portion or lip $l'$, similar to the lip $l$, and having substantially the same thickness as the material of the pipe $o$, and the parts being placed together as shown in Fig. 2 and thus adapted to be easily fused together to provide a flange on the end of the pipe.

Figure 3:
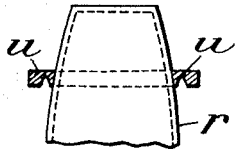

Fig. 3 shows the same process applied when it is desired to provide metallic casks such as $r$ with hoops $u$.

From the above description, it will be seen that the process of this invention comprehends the following general step: The thickness of the thicker piece is first reduced, at the part to be welded, to the same thickness or nearly the same thickness of the thinner piece; the two pieces are then placed together, or arranged in juxtaposition, so that the reduced portion of the thick piece will coöperate with the thin piece; then a flame is applied to the two pieces at the point where the thickness thereof is the same, the fusion taking place only at the part where the thickness has been reduced. Hence, in carrying the invention into practice the thickness of the thicker piece is reduced to the thickness of, or to nearly the same thickness as, the thinner piece by forming in the thicker piece a notch or groove or by providing the thicker piece with a part having substantially the same thickness as the thinner piece, so as to form a lip against which the extremity of the thin piece is placed. It suffices then to apply heat to the junction of the two pieces in order to fuse the metal equally and effect a tight joint. As will be obvious from the above description, according to our improved process, it is possible to weld, or unite together, two pieces of very different thickness without experiencing the difficulties and troubles heretofore resulting, in the ordinary process, from the fusion of the thinner piece before the thicker one has been raised to the welding temperature.

What we claim is:

The process for uniting two pieces of metal of different thicknesses comprising the following steps: first forming in the thicker piece a notch or groove, thereby producing a lip having substantially the same thickness as the thinner piece, placing the two pieces together so that the parts of uniform thickness will coöperate and then applying a source of heat at the point of coöperation of the parts of uniform thickness whereby said parts will heat and fuse uniformly and become properly welded together.

In witness whereof we have hereunto set our hand in presence of two witnesses.

FELIX JOTTRAND.
FREDERICK SCHMIDT.

Witnesses:
MAURICE GERBEAULT,
GEORG BETLE.